United States Patent [19]

Newton et al.

[11] 4,402,047

[45] Aug. 30, 1983

[54] COMPUTERIZED BRAKE CONTROL SYSTEM

[75] Inventors: Ronald O. Newton, Adams; Bruce W. Shute, Henderson Harbor; John J. Allen, Jr., Watertown, all of N.Y.

[73] Assignee: General Signal Corporation, Stamford, Conn.

[21] Appl. No.: 216,976

[22] Filed: Dec. 16, 1980

[51] Int. Cl.³ .................. G06F 15/20; B60T 8/00
[52] U.S. Cl. ........................ 364/426; 303/3; 303/20; 303/100
[58] Field of Search ............ 364/426; 303/3, 20, 303/100, DIG. 1; 246/182 B

[56] References Cited

U.S. PATENT DOCUMENTS

| | | | |
|---|---|---|---|
| 3,398,993 | 8/1968 | Sarbach et al. | 303/20 |
| 3,519,805 | 7/1970 | Throne-Booth | 364/426 |
| 3,910,646 | 10/1975 | Grix | 303/DIG. 1 |
| 3,924,902 | 12/1975 | Engle | 303/100 |
| 3,944,287 | 3/1976 | Nagase | 303/3 X |
| 4,005,838 | 2/1977 | Grundy | 246/182 B |
| 4,042,810 | 8/1977 | Mosher | 105/61 |
| 4,043,608 | 8/1977 | Bourg et al. | 364/426 X |
| 4,093,316 | 6/1978 | Reinecke | 303/100 |
| 4,107,253 | 8/1978 | Borg et al. | 246/182 B |

Primary Examiner—Jerry Smith
Attorney, Agent, or Firm—Leitner, Palan, Martin and Bernstein

[57] ABSTRACT

A computerized brake control system which calculates desired brake pressure from commanded brake signal, vehicle weight, vehicle speed and dynamic braking, compares the desired brake pressure with the actual brake, and controls the fluid brake system to cause the actual brake pressure to be substantially equal to the desired brake pressure. For snow brake mode the computer sets a fixed value of desired brake pressure which is used for controlling the fluid brake system. After a fixed number of stops, the brake mode is temporarily disabled.

16 Claims, 8 Drawing Figures

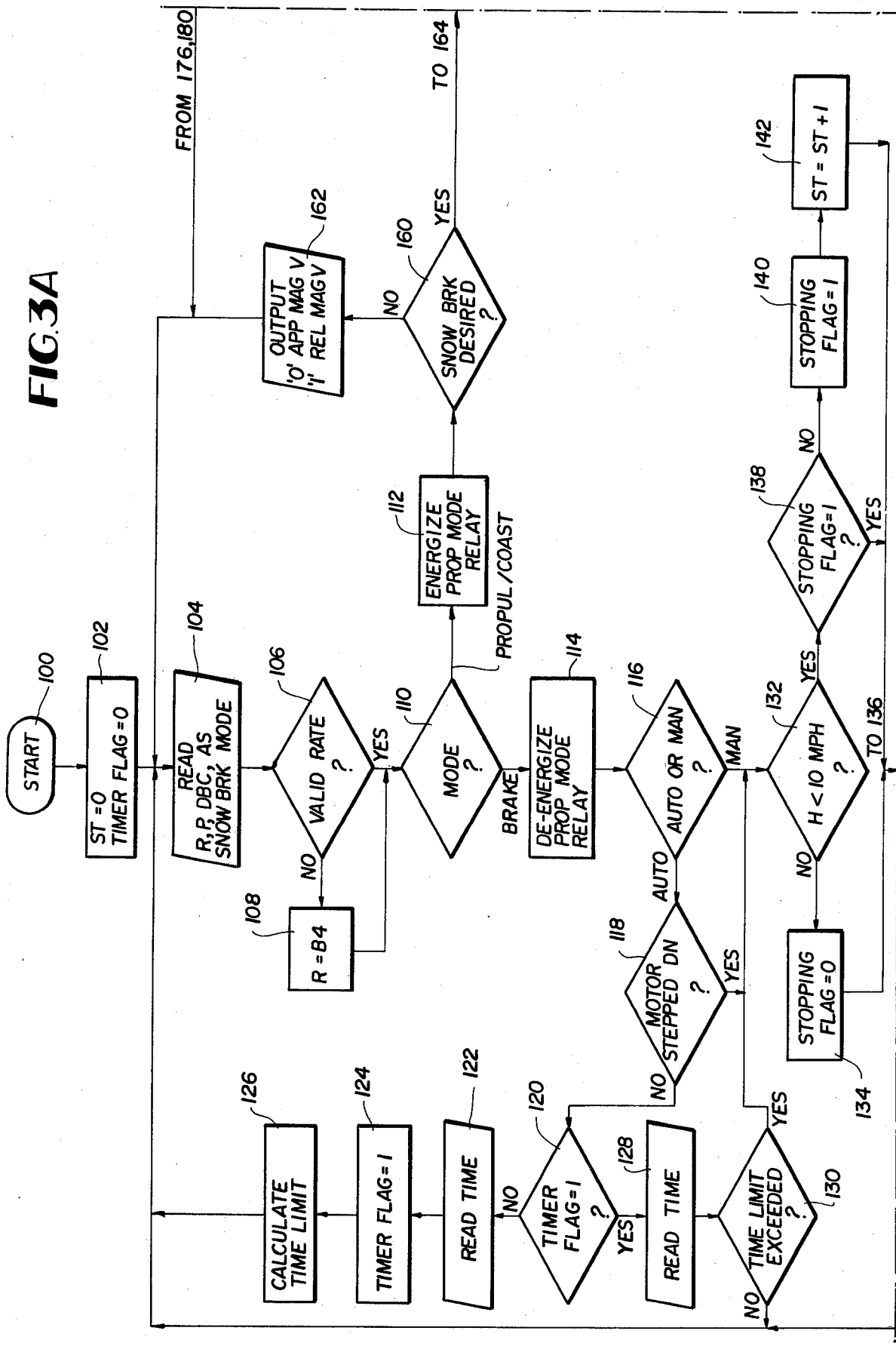

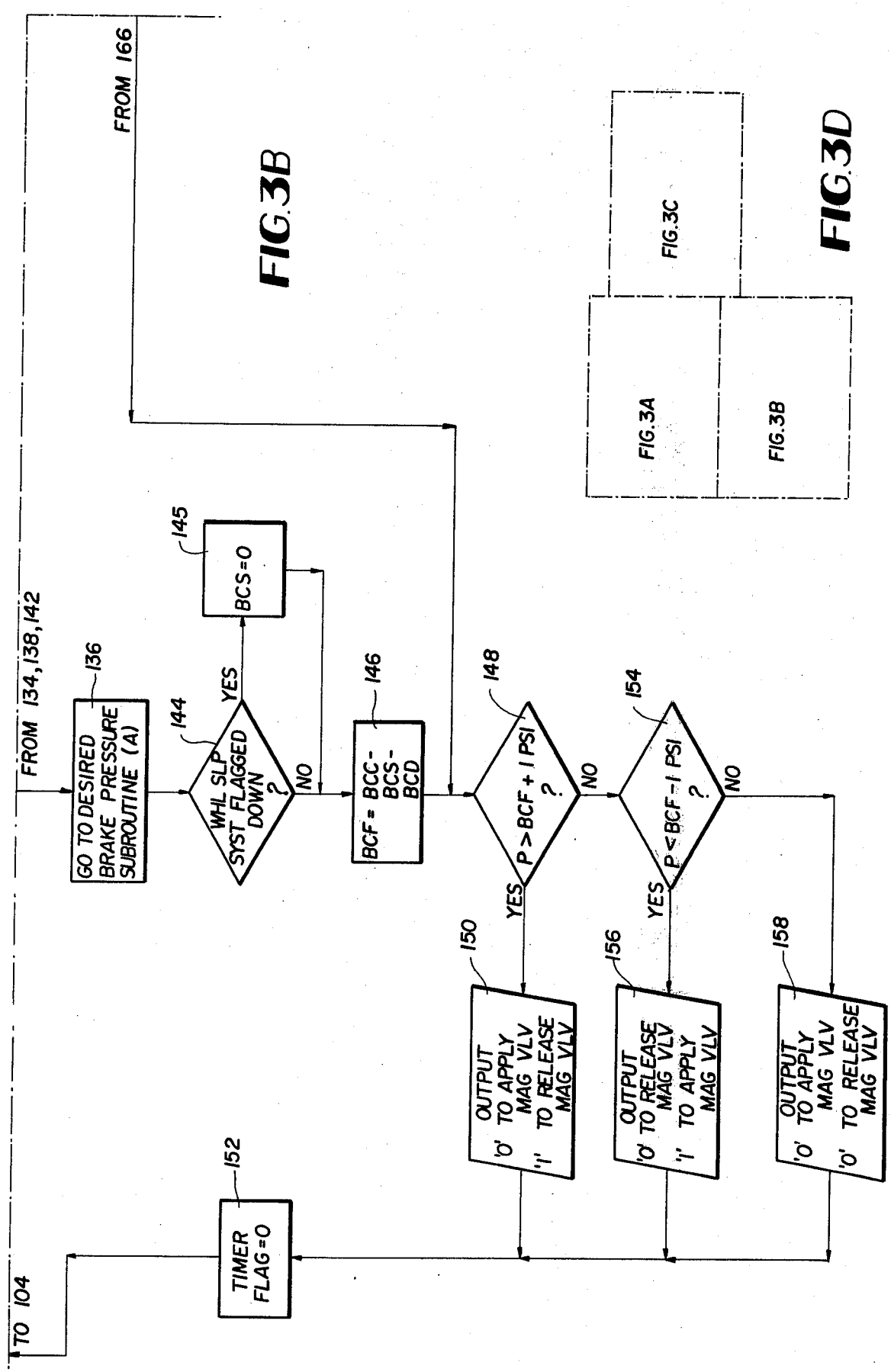

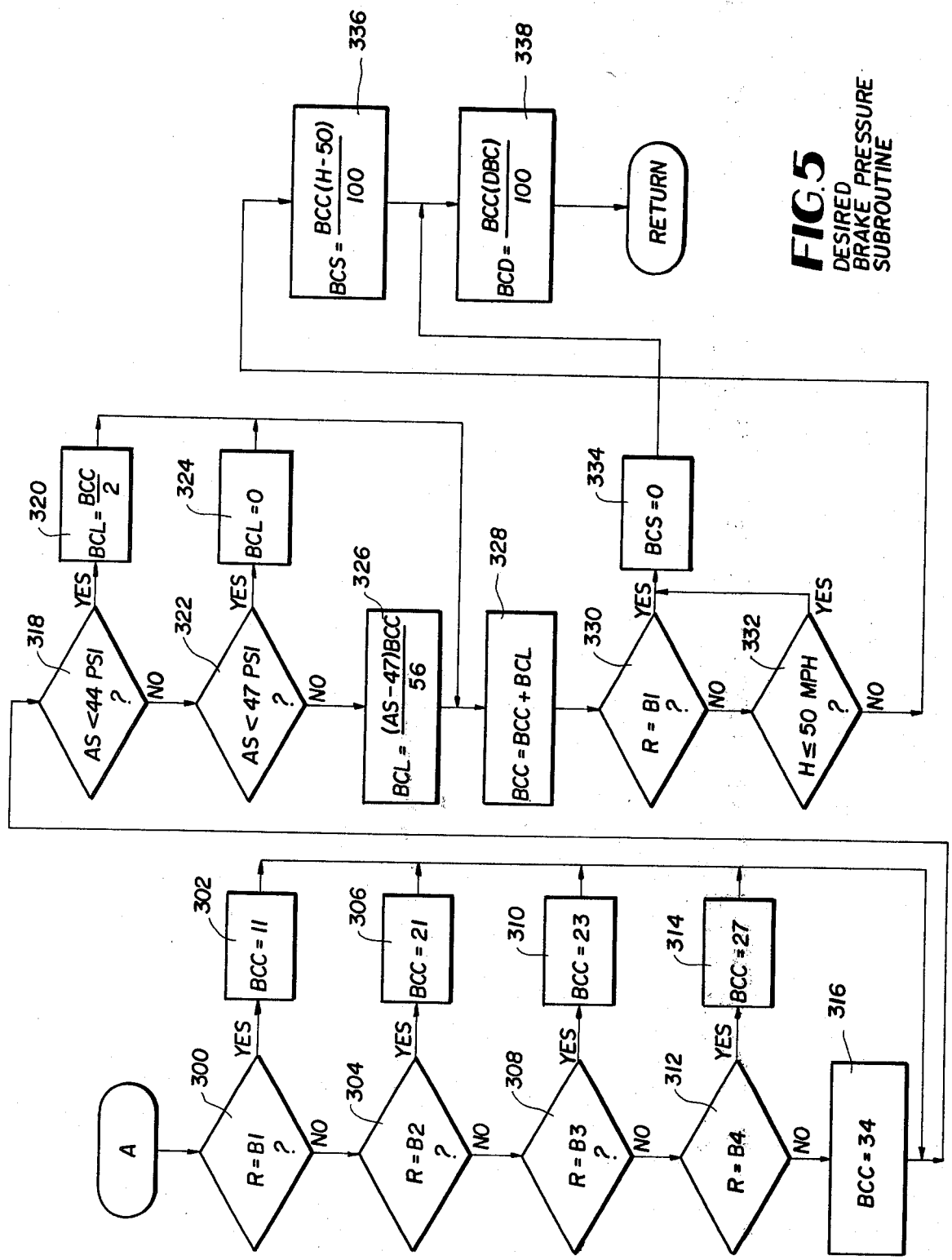
FIG.5 DESIRED BRAKE PRESSURE SUBROUTINE

COMPUTERIZED BRAKE CONTROL SYSTEM

BACKGROUND OF THE INVENTION

The present invention relates generally to brake control systems and more specifically to a digital computer brake control system.

The use of computers to control the braking system of a vehicle and more specifically a railroad vehicle is well known. They have generally been used to achieve a specific braking profile wherein the speed of the vehicle and the distance to stop are measured and then the required braking is calculated to bring the vehicle to zero velocity at the desired point. Typical examples are U.S. Pat. Nos. 3,519,805 and 4,005,838. Similarly computers have measured the velocity and acceleration and have used braking to maintain the vehicle at a required speed. An example of this is shown in U.S. Pat. No. 4,107,253. Computers have also been used to measure such variables as air brake pressure, wheel rotation, coupling forces between cars, locomotive velocity and wheel slip among others to provide traces of track profile, train presence upon the profile, car coupler force distribution and other train information to the operator. An example is illustrated in U.S. Pat. No. 4,042,810.

Although the computer controlled braking systems of the prior art just described are directed mainly to the more sophisticated application, they have failed to direct themselves to providing a more accurate braking control for normal braking. Similarly, the braking system of the light weight rail vehicles now used in the rapid transit system needs have not been met. The brake system for rapid transit rail vehicles have been individually designed for each rapid transit system. This is evolved since there is no need for uniformity as in the cross country rail system wherein cars must be interchangeable so that they may be connected to a multitude of different systems. Thus, each braking control system is designed with specific hardware to meet the needs of the individual customer. Thus, there is a need for a braking control system which is adapted to be tailored to individual system needs.

Mechanical brake control systems have been generally limited in the number of variables that they can use to affectuate appropriate braking. This has generally been limited to using an analog pressure in the brake pipe as the input signal and modifying it with a weight sensor to develop an appropriate braking pressure. Not only are the prior art mechanical braking control systems limited in the number of variables they use, but because of the environment, they require continual maintenance and replacement. Similarly the accuracy of the systems is somewhat limited.

SUMMARY OF THE INVENTION

An object of the present invention is to provide an improved braking control system.

Another object of the present invention is to use a digital computer to increase the accuracy of a braking control system by taking into account more variables and performing more complex calculations.

A still further object of the present invention is to provide a brake control system using a digital computer which may be tailored to almost any brake control system.

A still further object of the present invention is to provide coordination of the brake control system, the snow brake and the wheel slip control system.

These and other objects of the invention are attained by a control system for the fluid brakes of a vehicle having a digital computer which calculates a desired brake pressure using a commanded brake signal, sensed weight of the vehicle, sensed speed of the vehicle and sensed dynamic braking. The desired brake pressure is compared with the actual brake pressure and control signals are provided to the brake system to cause the sensed brake pressure to be substantially equal to the desired brake pressure. The desired brake pressure is calculated by providing a commanded brake pressure stored in the memory as a function of commanded brake signals. This commanded brake pressure is modified as a function of the weight of the vehicle to provide an appropriate brake pressure. For a weight below a first predetermined weight, no modification is performed, for weights above this predetermined weight, the commanded brake pressure is proportionally modified for the excess above the predetermined weight, and for the weight below a second predetermined minimum limit, which indicates an error in the weight measuring system, a fixed proportion of the commanded brake pressure is added to the commanded brake pressure. A speed component of the desired pressure is calculated as a proportion of the commanded brake pressure above a minimum speed. The dynamic braking component of the desired brake pressure is calculated as a direct proportion of the dynamic braking signal and the commanded brake pressure. The desired brake pressure is a summation of the commanded brake pressure, a weight pressure component, a speed pressure component, and a dynamic braking pressure component.

The digital computer also can determine operating modes which include braking mode, propulsion mode, coasting mode, and snow brake mode. The computer will only enter the snow brake mode if it is also in the propulsion coast mode. In the snow brake mode the desired brake pressure is set to a fixed value and used in the comparison part of the program. After a predetermined number of stops, the snow brake mode is disabled for a fixed period of time to allow the booster fluid circuit to adjust itself for wear. A stop is defined as a braking mode where the speed is below a predetermined value. The computer also takes into account information from the wheel slip portion and disables or ignores the speed component in the calculation of the desired brake pressure if the speed sensors become inoperative. The computer also determines whether the system is in the manual or automatic mode. For the combination of a brake and automatic mode, the computer determines whether the propulsion has been deenergized before applying a desired brake pressure. Depending upon the sensed speed, the computer will delay application of the braking signal if the propulsion mode is still present for a predetermined amount of time which is a function of speed.

BRIEF DESCRIPTION OF THE DRAWINGS

FIGS. 3A through 3C are a flow chart of the main portion of the digital computer program and FIG. 3D is a block diagram of how FIGS. 3A through 3C are interconnected.

FIG. 5 is a flow chart of the desired brake pressure subroutine.

DESCRIPTION OF THE PREFERRED EMBODIMENT

Figure 1:
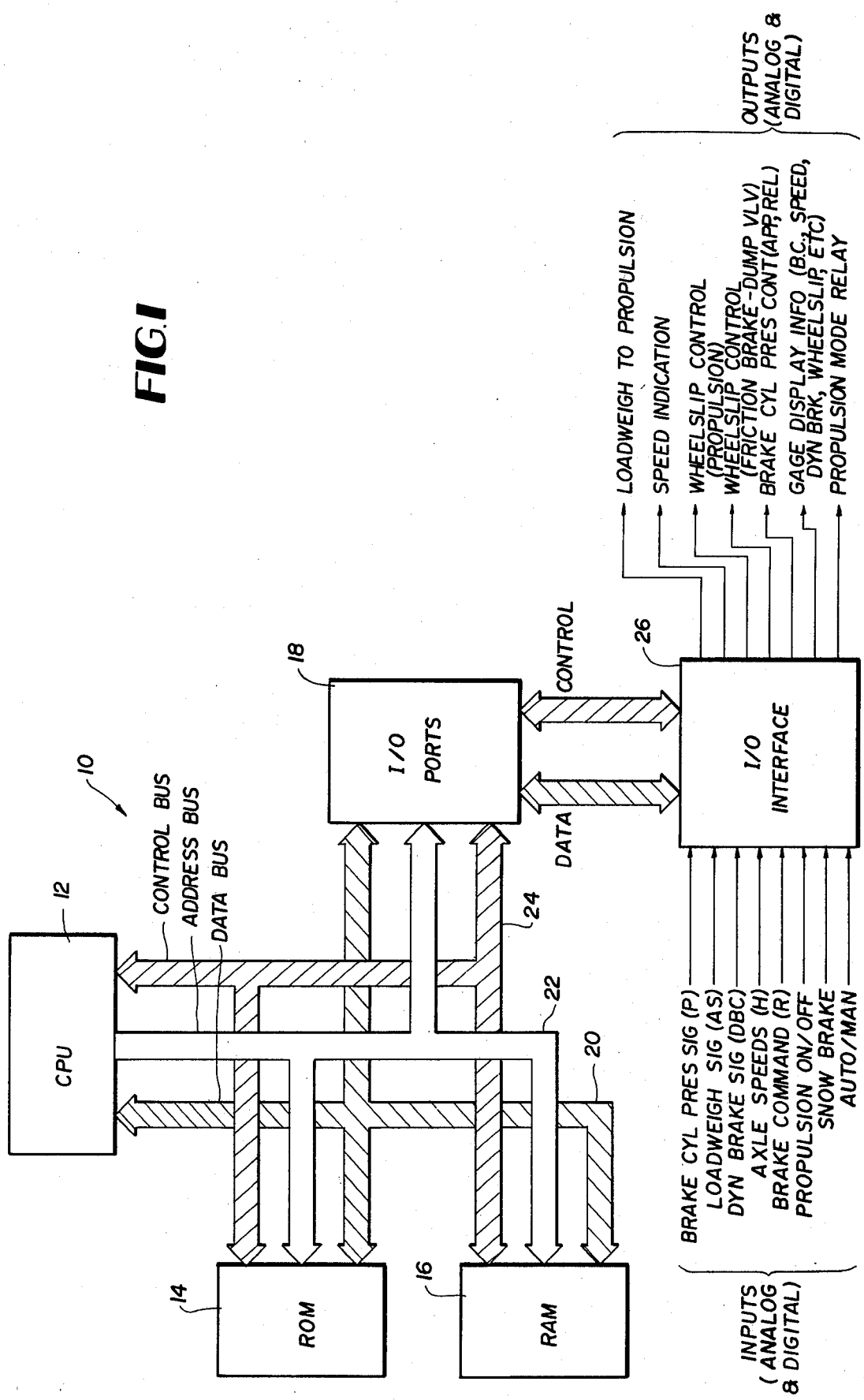
FIG. 1 is a block diagram of the digital computer portion of the braking control system incorporating the principles of the present invention.
Figure 4:
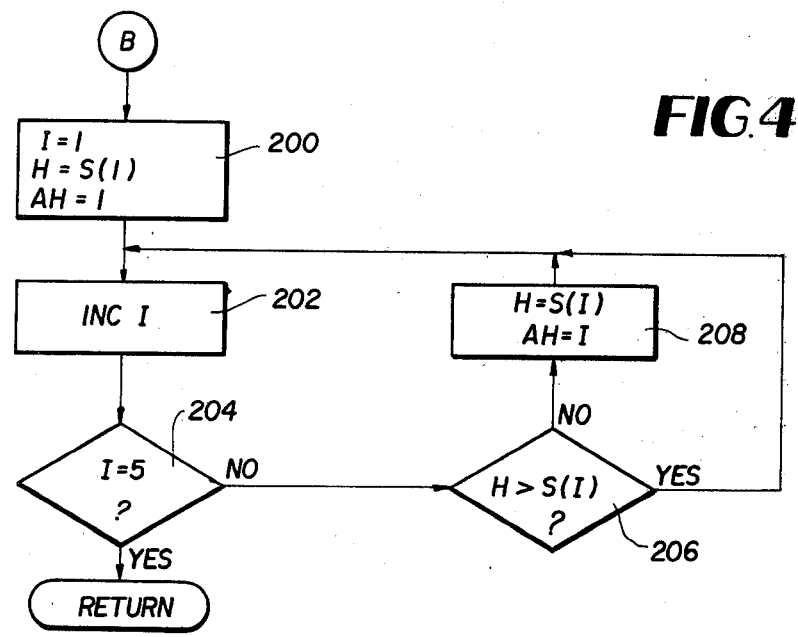
FIG. 4 is a flow chart of the fastest axle subroutine.
Figure 3C:
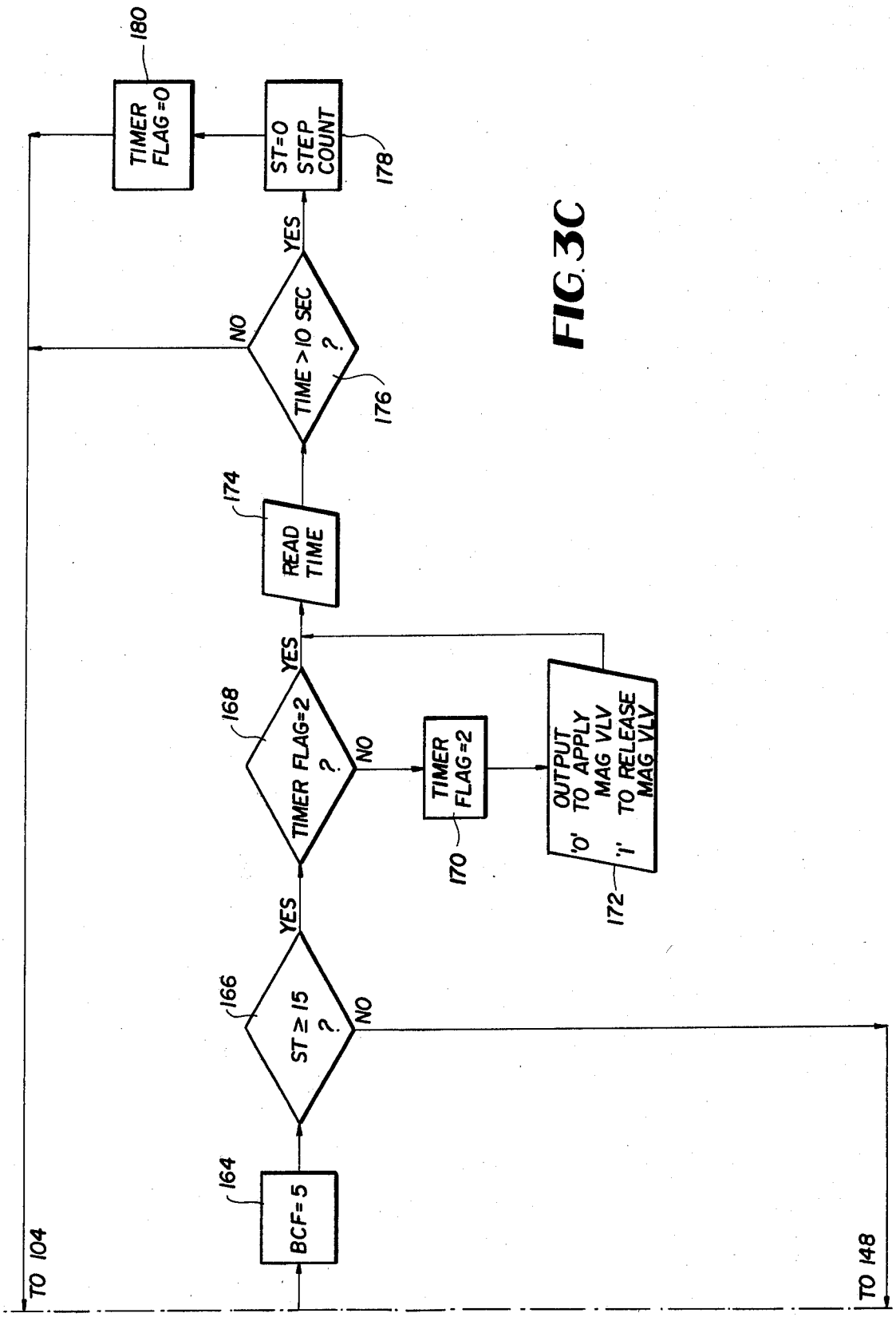

As illustrated in FIG. 1, the computerized control system for a fluid brake includes a computer 10 having a central processing unit (CPU) 12, a read-only memory (ROM) 14, a random-access memory (RAM) 16, and I/O ports 18. Data bus 20, address bus 22, and control bus 24 interconnect the components of digital computer 10. As is well known, the CPU 12 includes a clock, registers and other components required to perform the required operations. The ROM 14 contains a set of permanently stored data and instructions for operating the digital computer 10. Such instructions are commonly designated as a program which will be explained in detail herein below and is illustrated in FIGS. 3–5. The RAM 16 is used for temporary storage of data, for a work space or scratch pad and for I/O stacks. The I/O ports 18 provide communication between the computer 10 and the brake system.

An I/O interface 26 receives data from the brake system and the vehicle and provides it to the I/O port 18 as well as providing controls and output data to the braking system and control circuits of the vehicle. The inputs and outputs of the I/O interface may be analog or digital. Similarly the I/O interface may include a plurality of relays or other associated devices to convert the inputs to appropriate signals for the I/O port 18 and conversely to convert the output signals from the I/O port 18 to appropriate outputs for the vehicle system. Typical inputs illustrated in FIG. 1 include the brake cylinder pressure signal P, the load weight signal AS, the dynamic brake signal DBC, the axle speeds H, the brake command signals R, a propulsion on-off signal, a snow brake mode signal and an automatic/manual mode signal. The I/O interface 26 converts for example, brake cylinder pressure and load weight signal having analog values of 0 to 5 volts D.C. and dynamic brake signal having values of 0–100 ma signal on a 400 Hz carrier into digital values. As will be explained more fully, the brake command R, the propulsion on-off, the snow brake and the automatic/manual mode signal are used as mode signals or to determine mode of operation for the computer 10.

The output from the I/O interface 26 may include the load weight to the propulsion system, a speed indication, a wheel slip control to the propulsion system, a wheel slip control to the friction brake via the dump valve, a brake cylinder pressure control as an apply signal APP or a release signal REL, various signals to gauge for information as well as a signal to the propulsion mode relay.

Figure 2:
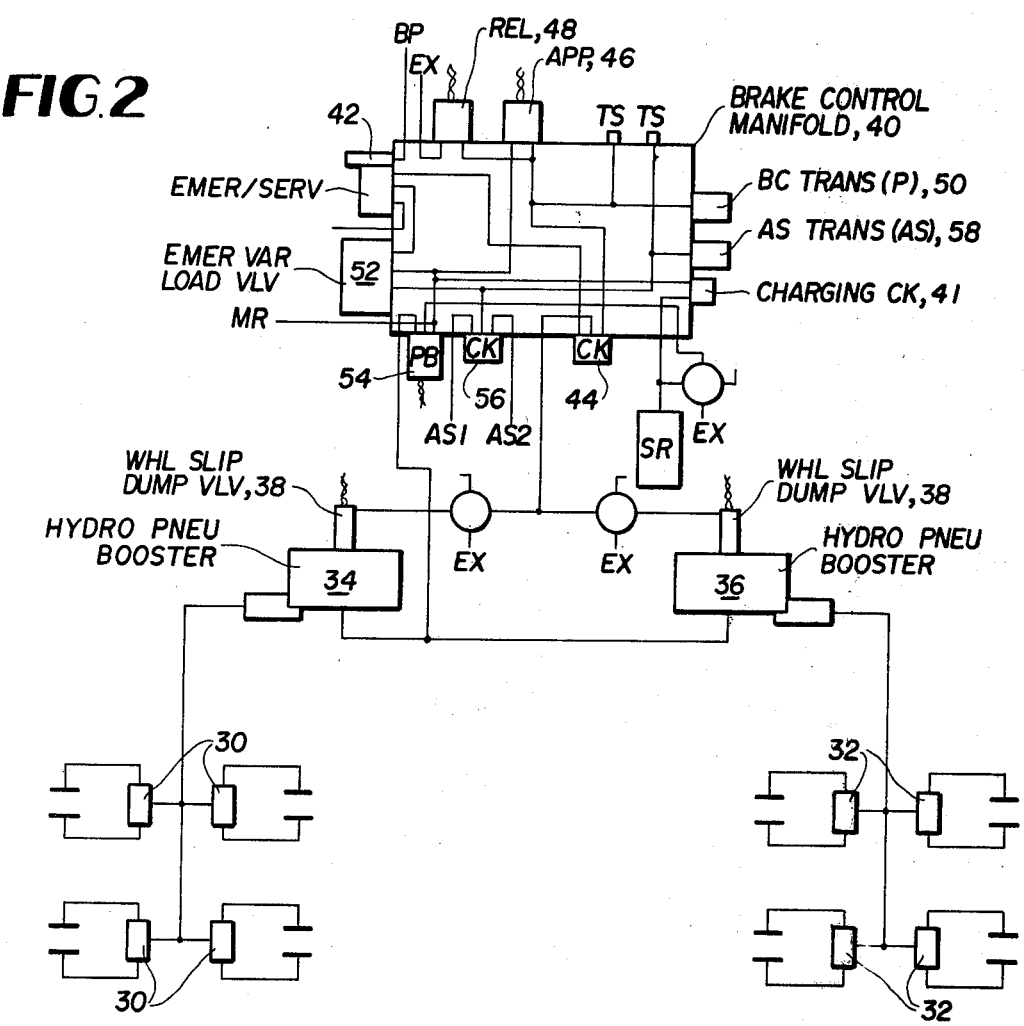
FIG. 2 is a block diagram of the fluid brake control system controlled by the computer of FIG. 1.

An example of the fluid brake system which may be controlled by the computer of FIG. 1 is illustrated in FIG. 2. The forward and rear brake actuators 30 and 32, respectively, are controlled by hydraulic/pneumatic boosters 34 and 36, respectively. A wheel slip dump valve 38 controls the boosters 34 and 36 for wheel slip conditions. The brake control manifold 40 interfaces the computer 10 of FIG. 1 and the boosters 34 and 36. The fluid system inputs are from the main reservoir MR, and the brake pipe BP. A charging check valve 41 interconnects the main reservoir MR and the supply reservoir SR to keep the supply reservoir SR totally charged.

The main reservoir MR is connected to the dump valves 38 through check valve 44 and the electromagnetically controlled apply APP valve 46. The release REL valve 48 connects the check valve 44 to exhaust. The actual brake pressure P is monitored by brake pressure transducer 50 connected to the common connection of apply APP valve 46 and release valve 48 to the check valve 44.

The main reservoir MR is connected through a variable load valve 52 to the emergency position of an emergency/service valve 42 which is responsive to the signal on the brake pipe BP to provide an emergency pressure signal through check valve 44 to the wheel slip dump valves 38 of the boosters 34 and 36. This allows a variable load braking signal to be provided as an input to the check valve 44 during an emergency condition. As will be explained relative to the operation of the computer, the weight variation during a service condition is taken into account in the calculation of a desired braking pressure by the computer. This value is compared to the actual pressure P by the computer which then electromagnetically controls the apply valve 46 and release valve 48 to control the pressure to the boosters 34 and 36.

The weight of the vehicle is determined by monitoring the pressure in the air springs as indicated by ports AS1 and AS2. These inputs through check valve 56 are provided to the emergency variable load valve 52 and to the air spring transducer 58 to provide the air spring signal AS to the computer. Electromagnetically controlled valve 54 is the parking brake. The brake control manifold 40 and its operation are well known and thus will not be described in detail. The elements which are described are those required to understand the operation of the computer 10 relative to the flow charts 3 through 5.

The flow chart of a sample program is illustrated in FIG. 3. As is well known and commonly used, the diamond shaped boxes indicate a decision type of operation and the square shaped rectangular shaped boxes indicate a functional type of operation. The program is begun at 100 which may be an initiation subroutine. The Stop Counter is set to zero and the Timer Flag is set to zero at instruction 102. As will be explained more fully later the Stop Counter is related to the snow brake mode and the Timer Flag indicates whether this is the first time through a given branch of the program. The computer then reads the commanded brake signal R from the rate wires, the actual brake cylinder pressure P, the dynamic brake feedback DBC, the weigh represented by the air spring signal AS, and the snow brake mode signal in instruction 104. The rate wires provide a rate code as described in Table I to define power modes as well as braking modes.

TABLE I

| RATE WIRE CODES | | | | |
|---|---|---|---|---|
| R1 | R2 | R3 | R4 | |
| 1 | 1 | 1 | 1 | Power Mode 4 or 5 |
| 1 | 1 | 1 | 0 | Power Mode 2 or 3 |
| 0 | 1 | 1 | 0 | Power Mode 1 or COAST |
| 0 | 0 | 1 | 0 | Brake Mode B1 |
| 0 | 0 | 1 | 1 | Brake Mode B2 |
| 0 | 0 | 0 | 1 | Brake Mode B3 |
| 0 | 0 | 0 | 0 | Brake Mode B4 |
| 0 | 1 | 0 | 0 | Brake Mode B5 |

Although the rate wires are digital inputs, an analog signal may be used and converted to a digital code by the I/O interface 26.

The first decision operation determines whether the rate is a valid rate at instruction 106. If the rate is not a valid rate, the rate value is set at 108 to the brake mode rate B4. If it is a valid rate, the next decision is instruction 110 wherein the mode of operation is determined. If the operating mode is the propulsion or coast mode, a propulsion mode relay is energized at 112. Braking routine will then proceed through the snown brake portion of the program as will be described later. If decision at instruction 110 indicates that it is in a braking mode, the propulsion mode relay is deenergized at instruction 114. This is followed by a decision instruction 116 which determines whether the mode of operation is automatic or manual.

If the vehicle is in the automatic mode of operation, instruction 118 determines whether the motor has been stepped down yet. This is determined by checking the propulsion on or off input from the propulsion system. If the propulsion signal is considered off which is defined as a coasting or braking mode, the motor is stepped down and the sequence of instructions will be identical of that for the manual mode decision out of instruction block 116. If the motor has not been stepped down or in other words the propulsion system provides a propulsion on signal even though a braking mode has been determined by instruction 110, the computer will prevent calculation of a braking signal for a predetermined time as a function of speed. Typical time delays are illustrated in Table II.

TABLE II

| TIME LIMIT FOR MOTOR STEP DOWN | |
|---|---|
| Speed > 70 MPH | Limit = .25 SEC |
| 70 MPH > Speed > 40 MPH | Limit = 1.00 SEC |
| 40 MPH > Speed | Limit = 2.00 SEC |

Instruction 120 checks to see whether the Timer Flag has been set to one which would indicate that the time limit routine has been entered before. If it is not set to one, the time is read at instruction 122 followed by setting the Timer Flag to one at instruction 124 and a time limit is calculated at instruction 126. The program is returned to the initial read instruction 104. The calculation of time at instruction 126 may be performed merely by reading the speed of the vehicle comparing it to the speed limits of Table II to classify the speed and then looking up the appropriate time limit stored as a function of the resulting classification of the speed. As the program retraverses through instructions 104, 106, 110, 114, 116, 118 and 120, the Timer Flag is now set at one and the program will proceed to instruction 128 where the Time is read. Instruction 130 then determines whether the read time exceeds the time limit calculated at instruction 126. If it exceeds the time limit, the program then begins the calculation of a braking signal. If not, instruction 130 returns to the read instruction 104 and retraverses the program.

If the vehicle is in the manual operation mode, as determined by instruction 116, or is in the automatic and the motor has been stepped down, as determined by instruction 118, or the motor is not stepped down but the time limit has been exceeded, as determined by instruction 130, a brake calculation is begun starting with decision instruction 132. The speed of the vehicle H is tested to see whether it is greater or less than a predetermined speed which may, for example, be ten miles per hour at instruction 132. This decision is used to determine whether the braking signal will be considered a stopping signal to be counted or whether it is just a non-stopping brake signal. If the speed is greater than 10 miles per hour, the Stopping Flag is set to zero by instruction 134 and the computer goes to the Desired Brake Pressure subroutine by instruction 136.

If the speed H is below 10 miles per hour, the Stopping Flag is checked at instruction 138 to determine whether it has been set to one or not. If it has been set to one by a previous instruction, instruction 136 is excecuted to transfer to the Desired Brake Pressure subroutine. If it has not been set to one by a previous pass through this loop, instruction 140 sets the Stopping Flag to one at instruction 140 and increments the Stop Counter at instruction 142. After these two instructions, instruction 136 transferring to the Desired Brake Pressure sub-routine is executed.

The speed H is set to the fastest axle speed and is determined by a subroutine illustrated in FIG. 4. The subroutine begins at instruction 200 to set the increment to one, to set the speed H to the speed of axle S(1), and to set the axle number AH to one. Instruction 202 then increments I and proceeds to decision instruction 204 where it is determined whether I equals five. If I does not equal five, signifying that the loop had not been traversed four times then all the axle speeds had not been compared and instruction 206 is executed. Instruction 206 determines whether H, which has been set to the speed of the first axle S(1), is greater than the second axle speed S(2). If S(1) is greater than S(2), instruction 202 is reexecuted to increment I. If H which represents the axle speed S(1) is not greater than S(2), then instruction 208 sets the speed H to the axle speed of the second axle S(2) and sets the axle number AH to two. The looping of instructions 202, 204, 206 and 208 are then repeated until the loop has been traversed four times at which point instruction 204 returns the subroutine back to the main program. This subroutine may be performed at any position prior to instruction 132. If the braking computer is part of a computer which also monitors wheel slip, this subroutine may be part of the wheel slip subroutine program and thus this value would have been precalculated and stored.

The Desired Brake Pressure subroutine, as illustrated in FIG. 5, calculates the individual brake pressure components which will be combined to produce the final desired brake pressure. The first portion of the program converts the commanded brake rate or braking mode into appropriate light load vehicle brake pressures signified by BCC. This light load brake pressure is then modified by a desired brake pressure weight component signified as BCL. Next a desired brake pressure speed component is calculated as BCS. Finally, a desired brake pressure dynamic braking component is calculated as BCD.

The Desired Brake Pressure subroutine begins by instruction 300 which determines whether the commanded brake signal or rate R is equal to B1. If the rate R is equal to B1 the light load desired brake pressure BCC is set by instruction 302 to, for example, 11 p.s.i. If the rate R does not equal B1, instruction 304 checks to see of it equals B2. If the rate R does equal B2, instruction 306 sets the light load desired brake pressure BCC to, for example, 21 p.s.i. If the rate R does not equal B2, instruction 308 checks to see if it equals B3. If it does, instruction 310 sets the light load desired brake pressure BCC to 23 p.s.i. If the commanded brake rate R does not equal B3, instruction 312 checks to see if it equals B4. If the commanded rate R is equal to B4, the light weight desired brake pressure BCC is set by instruction 314 to 27 p.s.i. If the rate R is not set to B4, it must be B5 and then light weight desired brake pressure BCC is set to, for example, 34 p.s.i. by instruction 316.

Next, the weight component of the desired brake pressure is calculated. Instruction 318 monitors the weight signal AS to determine whether it is less than 44 p.s.i. If it is, it sets the load desired brake signal component to BCL to the light weight desired brake pressure BCC over two by instruction 320. It should be noted that instruction 318 determines whether there is an error in the weight signal AS since if the monitored signal from the air springs AS is less than 44 p.s.i., it is erroneously indicating either a bad signal in the transducer or that the fluid lines are broken. Thus instruction 320 provides a substantial desired braking component to bring about what could be considered an emergency braking. If instruction 318 determines that it is a valid weight signal, instruction 322 determines whether the weight signal is below 47 p.s.i. If it is, it is considered a light load and the load component BCL is set to zero by instruction 324. If the air spring pressure is greater than 47 p.s.i., instruction 326 calculates a load desired brake pressure component BCL as a proportion of the brake pressure above 47 p.s.i. of the light load brake pressure signal BCC. As illustrated, the load component BCL is calculated as the proportion of the air spring pressure or load signal above 47 times the light weight desired brake pressure BCC divided by 56. The light weight desired brake pressure BCC is then set equal to the light weight desired brake signal plus the load component in instruction 328. This value will be used in further calculations requiring a value BCC.

In the desired braking pressure speed component section, instruction 330 determines whether the commanded rate signal R is equal to B1. If it is or if it is not and the speed H is less than 50 miles per hour, the speed component of the desired brake signal BCS is set to zero by instruction 334. If R is not equal to B1, as determined by instruction 330, and the speed H is greater than 50 miles per hour, as determined by instruction 332, a speed component of the desired brake pressure is calculated by instruction 336. The desired speed component BCS is the amount of the speed above 50 miles per hour divided by 100 multiplied times the desired brake pressure BCC. Thus for a speed H above a given minimum, the speed component provides a tapering effect.

Finally, the dynamic braking component of the desired brake pressure BCD is calculated by instruction 338. The dynamic brake component of the desired speed is equal to the dynamic feedback signal DBC divided by 100 times the desired braking signal BCC.

Thus subroutine of FIG. 5 has calculated and stored in memory the values for the desired brake pressure BCC which is a combination of the light load commanded brake signal and a load component, a speed component BCS and a dynamic braking component BCD. The subroutine returns to the program of FIG. 3 and to decision instructions 144.

Instruction 144 decides whether the wheel slip system flag is down. Depending upon the wheel slip program, this flag may be set down if it is determined that two or more speed sensors have failed. If it is, instruction 145 sets the speed component of the desired braking pressure BCS equal to zero since the speed information H may be inaccurate and thus should not be taken into account in calculating the desired braking pressure. If the wheel slip system flag is not down, the speed component BCS may be used in the calculation of the final desired braking signal. Instruction 146 calculates the final desired braking pressure BCF as being equal to the load compensated commanded braking pressure signal BCC minus the speed component BCS minus the dynamic braking component BCD.

Now that the computer has determined a final desired braking pressure BCF, it compares it against the actual sensed brake pressure P to produce an appropriate control of the brake system illustrated in FIG. 2.

Instruction 148 determines whether the actual pressure P is greater than the final desired braking pressure BCF plus 1 p.s.i. If the actual pressure P is greater than the final desired pressure, instruction 150 sets the apply valve signal to zero which deenergizes the apply valve 46 and sets the release valve signal to one which activates the release valve 48. This causes a reduction in the brake pressure. The Timer Flag is set to zero by instruction 152 and the program is reentered by instruction 104. The same results would occur until the actual pressure P is sufficiently reduced such that P will not be greater than the final desired brake pressure plus 1 p.s.i. and instruction 148 will then proceed to instruction 154.

Instruction 154 determines whether the brake pressure P is less than the final desired brake pressure BCF minus 1 p.s.i. If it is, instruction 156 deactivates the release valve 48 and activates the apply valve 46. This is followed by setting the Timer Flag to zero by instruction 152 and proceeding to begin the sequence again by instruction 104. Instruction 148 and/or 154 is reexecuted for every loop until the actual pressure P is within a plus or minus 1 p.s.i. of the final desired pressure BCF. If it is, instruction 158 is executed which deactivates both the apply valve 46 and the release valve 48. This locks the brake actuators 30 and 32 in their desired braking pressure for the continuance of the braking mode.

Another portion of the present braking program includes the capability of controlling the snow brake. A snow brake, as is known in the industry, is applying a small braking pressure to the brake to keep the brake shoes in light contact with the disc or tread. This creates friction and heat which prevents ice from forming on the brake shoes. The problem with prior art snow brakes is that with continuous running in the snow brake mode, the booster valve pressure has not been compensated for wear of the brakes. The present braking control system sets the desired braking pressure at a small pressure and uses the comparison and control portion of the circuit to control the brakes. Similarly the number of stops are monitored and the snow brake is disabled for a predetermined amount of time to allow the booster fluid circuit to compensate for wear of the brakes.

As mentioned previously, instruction 110 determines whether the braking mode or the propulsion/coast mode is required. If it is the propulsion/coast mode, instruction 112 energizes the propulsion mode relay. Instruction 160 then determines whether the snow brake mode is desired or not. If it is not desired, instruction 162 deactivates the apply valve 46 and activates the release valve 48. This assures that the brakes are not applied in the propulsion or coast mode. If the snow brake mode is desired, instruction 164 sets the final desired brake pressure BCF to a low pressure, for example, 5 p.s.i. Instruction 166 then determines whether the number of stops which have been counted by the instructions 132, 138, 140 and 142 exceed a fixed number. This number may be, for example fifteen. If the fifteen stops have not been counted, the program transfers to instruction 148 to compare the actual brake pressure P with the final desired brake pressure BCF which has been set to five by instruction 164. Instructions 148, 150, 154, 156 and 158 are then executed to control the braking system of FIG. 2 such that the actual pressure P is 5 plus or minus 1 p.s.i.

If fifteen stops have been counted, instruction 168 follows instruction 166 and tests the Timer Flag to see if it is set to 2. If the Timer Flag Test is not set to 2, indicating that it is the first time through instruction 168, instruction 170 sets the Timer Flag to 2. Following instruction 170, instruction 172 deactivates the apply valve 46 and activates the release valve 48 to deactivate the control to the boosters 34 and 36 such that the pressure in the boosters 34 and 36 is modified to compensate for brake wear. Next instruction 174 reads the time and instruction 176 compares it against a preselected time, for example 10 seconds. If the time limit has not been exceeded, the program is returned to instruction 104 and the snow brake loop is reentered. If the time limit has been exceeded, instruction 178 resets the Stop Counter to zero and instruction 180 sets the Timer Flag to zero before returning it to the entrance of the program loop at instruction 104.

Thus it can be seen that the present control system is versatile enough to allow integration of the snow brake into the brake pressure comparison and control loop as well as allowing the brake system to disable the snow brake for a given period of time to allow the booster pressure to be modified to compensate for brake wear. The selection of fifteen stops and ten second delay are arbitrary and other numbers may be used.

From the preceding description of the preferred embodiment, it is evident that the objects of the invention are attained in that a computer brake control system is provided which allows versatility of the system to many applications and modification of the program as well as providing direct control of the fluid brake system. The present system can take into account more variables in determining the desired braking pressure as well as having the ability to more quickly update the desired braking pressure for quickly changing conditions than prior art system. The present system has also integrated the snow brake mode into the brake control system and allows for compensation for wear even if in the snow brake mode. Although the invention has been described and illustrated in detail, it is fully understood that the same is by illustration and example only and is not to be taken by way of limitation. Other operating variables may be monitored and can be taken into account in the calculation of the desired brake pressure. The spirit and scope of the present invention are to be limited only the terms of the appended claims.

What is claimed:

1. A control system for fluid brakes of a vehicle which controls fluid pressure during operating modes of said vehicle comprising:
    means for sensing the variables necessary to accurately calculate an optimum total desired brake pressure for a particular operating mode of a particular vehicle and for sensing the present brake pressure of that vehicle; said variables including the weight and speed of that particular vehicle at that particular time as well as a commanded brake signal;
    digital computer means for repeatedly calculating an optimum total desired brake pressure as a function of said sensed variables, comparing said optimum total desired braking pressure with said sensed present brake pressure, and providing control signals to the fluid brake system to cause the sensed present brake pressure to change to become substantially equal to said desired brake pressure; and
    means for interfacing said digital computer and said fluid brake system for permitting said control signals to control brake system fluid pressure.

2. The control system according to claim 1 including means for sensing dynamic braking and said digital computer means calculating said total desired brake pressure also as a function of said sensed braking and the dynamic braking component of said total desired brake pressure proportional to said sensed dynamic braking.

3. The control system according to claim 1 wherein said speed sensing means senses the speed of each axle of the vehicle and said digital computer means determines the highest axle speed and sets the speed of the vehicle to said highest axle speed.

4. The control system according to claim 1 wherein said digital computer means calculates a total desired brake pressure speed component proportional to the magnitude of said sensed speed above a minimum speed and disables calculation of said speed component for sensed speeds below that minimum speed.

5. The control system according to claim 1 wherein said digital computer means calculates a total desired brake pressure weight component proportional to the magnitude of said sensed weight above a first minimum weight, proportional to the commanded brake signal for a sensed weight below a second minimum weight which is less than said first minimum weight, and equal to zero for a weight between said first and second minimum weights.

6. The control system according to claim 1 wherein said digital computer means determines the malfunctioning of variable sensors and disregards that sensed variable in calculating said total desired brake pressure when a malfunction occurs.

7. The control system according to claim 1 including means for sensing the operating mode of said vehicle and provide signals representative of the particular operating mode to said digital computer, and said digital computer calculates said total desired brake pressure also as a functon of said operating mode.

8. The control system according to claim 7, wherein said operating mode means provides a snow brake mode signal.

9. The control system according to claim 8 wherein said digital computer means calculates a fixed total desired brake pressure for the duration of said snow brake mode signal.

10. The control system according to claim 9 wherein said operating mode means also provides a propulsion and coasting mode signal and said digital computer means calculates said fixed total desired brake pressure for said snow brake mode signal only in combination with a propulsion or coasting mode signal.

11. The control system according to claim 7 wherein said operating mode means provides a manual or automatic mode signal and a propulsion mode signal.

12. A control system according to claim 1 wherein said digital computer means includes storage means for storing a plurality of brake pressure values and said digital computer means selects a stored brake pressure value as a function of said command brake signal to be used in the calculation of said total desired brake signal as a brake pressure.

13. A control system according to claim 1 wherein said digital computer means determines wheel slip and disregards sensed speed in calculating said total desired brake signal for a given magnitude of wheel slip.

14. A control system for fluid brakes of a vehicle comprising:
  means for providing a commanded brake signal;
  means for sensing brake pressure;
  means for providing operating mode signals;
  digital computer means for calculating desired brake pressure as a function of said command brake signal and operating mode signals, comparing said sensed brake pressure and desired brake pressure, and providing control signals to a fluid brake system to cause said sensed brake pressure to be substantially equal to said desired brake pressure;
  said operating mode signal means including means to provide a snow brake mode signal; and
  said digital computer means counts the number of braking to stop cycles and temporarily disables said snow brake mode at a fixed number of counted braking to stop cycles.

15. The control system according to claim 14 including means for sensing the speed of said vehicle and wherein said digital computer means counts the combination of a braking mode signal and speed below a predetermined vehicle speed as a braking to stop cycle.

16. A control system for fluid brakes of a vehicle comprising:
  means for providing a commanded brake signal;
  means for sensing brake pressure;
  means for providing operating mode signals;
  digital computer means for calculating desired brake pressure as a function of said command brake signal and operating mode signal, comparing said sensed brake pressure and desired brake pressure, and providing control signals to a fluid brake system to cause said sensed brake pressure to be substantially equal to said desired brake pressure;
  said operating mode means including a manual or automatic mode signal and a propulsion mode signal;
  means for sensing the speed of said vehicle, wherein said digital computer means includes storage means for storing a plurality of time limits; and
  wherein said digital computer means inhibits calculation of said desired brake pressure in response to the combination of automatic and propulsion mode signals for a stored time limit selected as a function of sensed speed.

* * * * *

UNITED STATES PATENT AND TRADEMARK OFFICE
CERTIFICATE OF CORRECTION

PATENT NO. : 4,402,047

DATED : August 30, 1983

INVENTOR(S) : Newton et al.

It is certified that error appears in the above—identified patent and that said Letters Patent is hereby corrected as shown below:

Column 4, line 52, change "weigh" to --weight--;

Column 5, line 11, change "snown" to --snow--;

Column 6, line 18, change "sub-routine" to --subroutine--;

line 64, change "of" to --if--;

Claim 2, line 4, insert "dynamic" before "braking".

Signed and Sealed this

Fifteenth Day of May 1984

[SEAL]

*Attest:*

GERALD J. MOSSINGHOFF

*Attesting Officer*     *Commissioner of Patents and Trademarks*